United States Patent [19]

Lobo et al.

[11] Patent Number: 4,477,953
[45] Date of Patent: Oct. 23, 1984

[54] WOUND CAPACITOR END CONNECTIONS AND METHOD OF OBTAINING SAME

[76] Inventors: Edward M. Lobo, New Bedford; Donald F. Hunter, Wareham, both of Mass.

[21] Appl. No.: 280,924

[22] Filed: Jul. 6, 1981

[51] Int. Cl.³ .......................... H01G 7/00; H01G 1/14
[52] U.S. Cl. .................................... 29/25.42; 361/309
[58] Field of Search ................ 361/308, 309; 25/29.42

[56] References Cited

U.S. PATENT DOCUMENTS

| | | | |
|---|---|---|---|
| 1,470,781 | 10/1923 | Thomas | 29/25.42 |
| 2,915,808 | 12/1959 | Clemons | 29/25.42 |
| 2,940,161 | 6/1960 | Elarde | 29/155.5 |
| 3,067,488 | 12/1962 | Bennett et al. | 29/155.5 |
| 3,364,401 | 1/1968 | Rayburn | 361/308 X |
| 3,522,498 | 8/1970 | Price | 361/309 X |
| 3,891,901 | 6/1975 | Booe | 361/309 |
| 3,906,297 | 9/1975 | Hunt | 361/309 |

FOREIGN PATENT DOCUMENTS

| | | | |
|---|---|---|---|
| 59892 | 8/1955 | France | 361/309 |
| 558688 | 1/1944 | United Kingdom | 361/309 |
| 1224124 | 3/1971 | United Kingdom | 361/308 |

Primary Examiner—Donald A. Griffin

[57] ABSTRACT

Electrical terminals for a wound capacitor section and a method of attaching the electrical terminals to the section are disclosed. Adjacent convolutions of a wound capacitor section are electrically connected to one another through conventional metal spraying techniques. Flat copper tabs having the surfaces thereof tinned, as with a thin layer of solder, provide the terminal connection leads for use of the capacitor in an electrical circuit. The tinned copper tabs are secured to either end of the capacitor section by tack welding the tab to the sprayed metal end of the winding. Tack welding of the tab to the metal coating insures electrical connection but provides little strength in mechanical connection. Each end of the capacitor section is then again provided with a sprayed metal coating over both the first coating and the tinned tabs.

3 Claims, 5 Drawing Figures

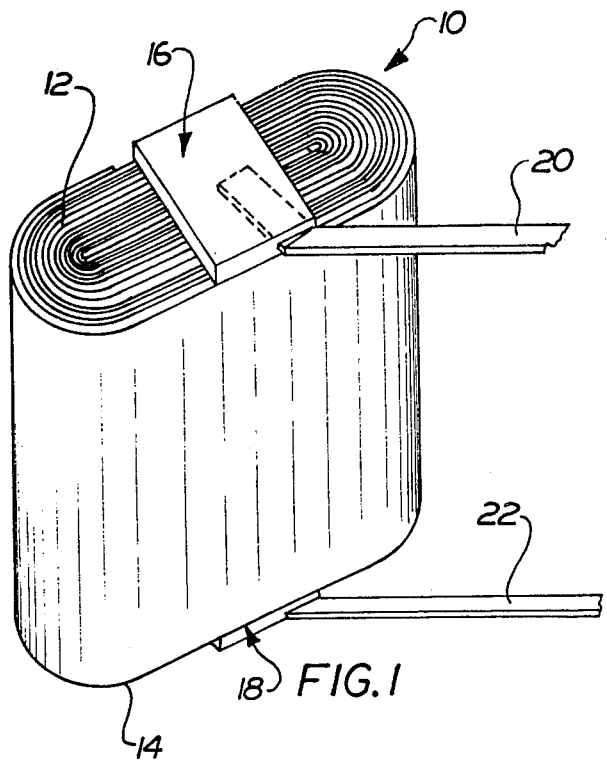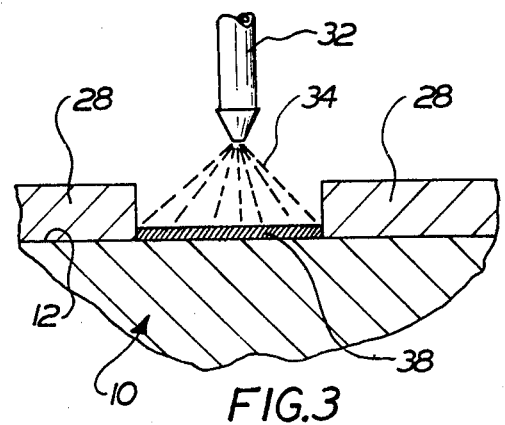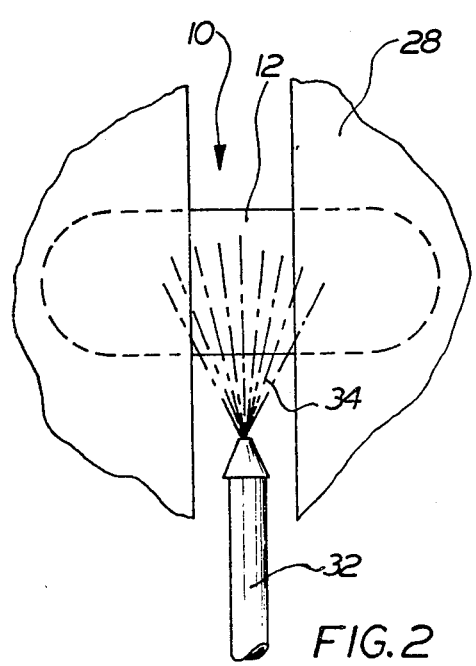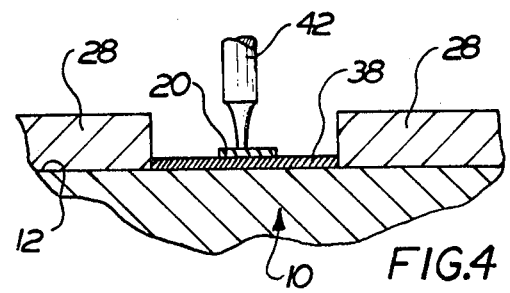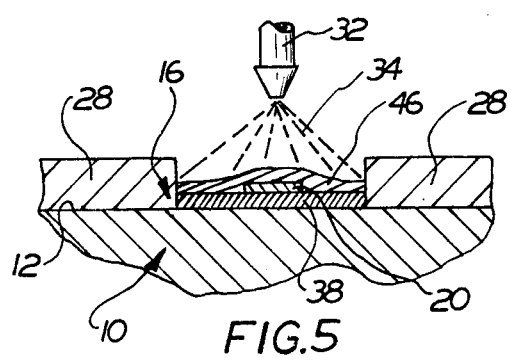

4,477,953

WOUND CAPACITOR END CONNECTIONS AND METHOD OF OBTAINING SAME

BACKGROUND OF THE INVENTION

The present invention relates to an improvement in wound capacitors, and, more particularly, to the connection of electrical terminals to the ends of wound capacitor sections.

Conventional wound AC capacitors are constructed by continuously winding two electrode materials with an insulating layer separating the two throughout their total length. The dimensions of the electrodes as well as the dielectric separating these two structures determine the capacitance of the wound structure. Generally, the electrodes are arranged to continually extend from alternate ends of the wound capacitor section thus providing a convenient means for terminating the two electrodes. All of the adjacent convolutions of one electrode are short-circuited at one end of the capacitor section, while all of the adjacent convolutions of the other electrode are short-circuited at the opposite end of the winding. Short-circuiting of adjacent convolutions at either end of the winding may be accomplished through any of a number of known methods such as soldering, welding, or spray metal coatings.

Soldering of electrical terminals to a capacitor section has the disadvantage of requiring a flux for an efficient solder connection. The presence of the flux, some of which remains after the soldering is completed, contaminates the capacitor section. Depending upon the particular construction of the electrodes of a wound capacitor, welding of electrical terminals to the capacitor likewise presents disadvantages. The localized weld connection of a terminal to a capacitor section may cause oxidation at these areas resulting in high resistance connections. U.S. Pat. No. 3,067,488 illustrates one example of a welded electrode structure. The terminal connections are welded to the exposed foil electrodes, which may be aluminum or any other metal. The welds occur at points 11 provided by projections 9 on the surface of the terminal material, while the balance of the terminal has a coating of insulating material thereon to prevent welding. It is at these points 11 that oxidation may occur and cause a high resistance connection.

A sprayed metal coating onto the ends of the capacitor section, such as shown in U.S. Pat. No. 2,915,808, may be used to terminate both ends of the wound capacitor and provide for connection of electrical terminals. Electrical terminals may thereafter be attached to the sprayed metal coating as by soldering, as shown in U.S. Pat. No. 2,940,161. Even this combination of sprayed metal coating plus soldering of electrical terminals encounters the disadvantage noted above with respect to soldering fluxes.

SUMMARY OF THE INVENTION

In accordance with the present invention, a wound capacitor section has electrical terminals connected thereto in a manner providing excellent electrical contact as well as strong mechanical connection in a quick and efficient operation. The present invention provides terminals for electrical connection of a wound capacitor as well as a method for attaching the terminals to the capacitor.

An efficient and reliable alternative to soldering or welding electrical terminals to capacitor sections is provided by the present invention. Contamination of the capacitor section caused by the presence of soldering fluxes is avoided while oxidation at the point of weld to the electrode is avoided. Additionally, the connection of the present invention has proven to be stronger than either solder or weld connections. Conventional spray-applied, conductive metal terminations are used, in a modified form, to both mechanically and electrically connect electrical terminations to a capacitor section. The modification of spray application results in a metal terminal being sandwiched between two applications of spray metal at the ends of the capacitor section. The resultant termination of the section provides extremely reliable mechanical connection as well as low resistance electrical connection in a quick, efficient and inexpensive manner not heretofore possible.

BRIEF DESCRIPTION OF THE DRAWINGS

FIG. 1 is a perspective view of a capacitor section having electrical terminal connections made in accordance with the present invention;

FIG. 2 is a plan view of a capacitor section having a metal layer spray applied to a portion of the end thereof;

FIG. 3 is a partial cross-sectional view of the capacitor as shown in FIG. 1 at the first stage of the application of an electrical terminal thereto;

FIG. 4 is a partial cross-sectional view of the capacitor shown in FIG. 1 illustrating another stage in the application of an electrical terminal to the capacitor section; and FIG. 5 is a partial cross-sectional view of the capacitor shown in FIG. 1 illustrating yet another stage in application of electrical terminals to the end of the capacitor section.

DETAILED DESCRIPTION OF THE PREFERRED EMBODIMENT

FIG. 1 illustrates a capacitor 10 constructed in accordance with the objects and advantages of the present invention. The capacitor is of the type constructed by winding two separate but continuous lengths of electrode material and an insulating sheet, alternately in a cylindrical or flat pack configuration. While the capacitor section shown in FIG. 1 illustrates the flat pack configuration, the objects and advantages of the present invention are equally applicable to any other configuration of capacitor windings, and the descriptions throughout this specification are not intended to limit the invention herein to any particular embodiment of a wound capacitor. The electrodes (individually not shown in the figures) of capacitor 10 are provided in overlying relationship such that each of the two electrode materials extends from one end or the other of capacitor section 10. Insulating sheet material (not shown) provided between the electrodes assures that short-circuiting does not occur between the windings within the completed capacitor section.

The electrodes of capacitor 10 may be any of a number of known electrode constructions such as metal foil, metallized plastic on one or both surfaces, metallized paper on one or both surfaces, or combinations of the above. The principles of the present invention are not limited to any one of the aboveidentified electrode structures, but are equally applicable to any or all of these structures.

The wound construction of capacitor 10 results in each of two ends, 12 or 14, having a plurality of adjacent convolutions of the electrode winding extending therefrom. It is well known in the art of constructing capacitors that electrical connections to the electrodes of the capacitor are effected by short-circuiting the extended, adjacent convolutions of each electrode. The entire end of the wound capacitor section need not be short-circuited, but rather, only a portion of the cross-section is customarily short-circuited. Capacitor section 10 shown in FIG. 1 illustrates the short-circuiting of each end 12 and 14 of the capacitor in accordance with the concept of the present invention as at 16 and 18, including electrical terminals or tabs 20 and 22.

Since the construction of end connections 16 and 18 at ends 12 and 14 of capacitor section 10 are identical, the discussion herein will be limited to the construction at end 12 of the capacitor. FIG. 2 illustrates a fairly conventional means by which end 12 of the capacitor would have adjacent convolutions short-circuited by liquefied spray coating of metal. While FIG. 2 shows only one capacitor 10, actual production manufacturing of capacitors would, in fact, be accomplished on a multitude of capacitor sections simultaneously. The capacitor, in this case constructed as a flat pack, is placed with end 12 facing upward. A mask structure 28 covers the portion of the end which is not desired to have a metal coating spray applied thereto. The section of the capacitor which is covered with the metal coating is generally a central cross-sectional area of the capacitor end. A spray nozzle 32 is moved in a continuous path along the opening in mask 28 while liquefied conductive metal is dispersed therefrom. The metal used for providing the conductive coating on the end of the capacitor may be any one of a number of electrically conductive metals, but is preferably zinc or a zinc alloy in liquid form.

FIG. 3 shows a cross-section of spray jet 32 applying a first layer 38 of electrically conductive metal to capacitor section 10 through mask 28 as exemplified by FIG. 2. The liquefied metal adheres to the exposed edges of the capacitor section between and on each individual convolution of the electrode material. Adherence of the liquefied metal to the electrode material is accomplished regardless of whether solid metal foil, metallized plastic or metallized paper are used in the construction of the electrode.

In the case of conventional metal spray terminated capacitor sections, once a layer of metal has been applied to the end convolutions of the capacitor through a spray application, electrical terminals are then attached by soldering or welding the terminal to the end spray. When the terminal is soldered to the end spray, soldering flux is caused to flow onto the end 12 of the capacitor. Soldering flux causes disruption of operation due to contamination of the wound capacitor section. Welding of electrical terminals to the end spray likewise causes difficulty in that oxidation at the welds causes high resistance connections to the electrodes of the capacitor.

In the case of the end spray applied as in FIG. 3, the thickness of first layer 38 is approximately one-half the thickness of a normal end spray coating (preferably about 0.020 inch). As in conventional end spray techniques, mask 28 assures that liquefied metal 34 is confined only to a predetermined area of the cross-section of capacitor 10. Once first layer 38 has solidified, electrical terminal or tab 20 can be applied to the layer. Tab 20 may be constructed of an electrically conductive metal, such as copper, and preferably is tinned at least at one end thereof. Tinning is accomplished by having a thin layer of solder or other material applied to the terminal by conventional methods.

The tinned electrical terminal is then secured to first layer 38 as shown in FIG. 4. The securement of electrical tab 20 provides electrical connection but not necessarily mechanical connection of the terminal to the layer. The tab may be, and preferably is, permanently secured to first layer 38 by means of tack welding such as by application of a welding electrode 42 pressing the tab against first layer 38. The application of pressure and heat to tab 20 by electrode 42 is of such a small degree as to not effect first layer 38 or the electrode material in end 12 of the capacitor. Welding electrode 42 provides one or more tack welds of tab 22 to first layer 38.

As noted above, the tack weld of the tab provides electrical connection of the tab but does not necessarily provide adequate mechanical connection. Additional strengthening of the connection is required to assure that tab 20 is not pulled loose from the capacitor section. FIG. 5 illustrates the means by which this additional mechanical connection is made. With mask 28 still positioned over end 12 of the capacitor section, spray jet 32 is again passed over the capacitor section such that liquefied conductive metal 34 is dispersed onto the capacitor section. In this manner, a second layer 46 of conductive metal is applied to the capacitor immediately overlying both first layer 38 and tab 20. As this layer of liquid metal solidifies, tab 20 is permanently captured between first and second layers 38 and 46 to form a complete and effective mechanical bond of the tab to the capacitor section. Second layer 46 is likewise preferably zinc or a zinc alloy and is equal in thickness to first layer 38 (preferably 0.020 inch) such that the total thickness of end connection 16 is approximately equal to the thickness of a conventional end connection (approximately 0.040 inch).

Use of end connections 16 and 18 along with tabs 20 and 22 at the respective ends of a coiled capacitor provide improved reliability in that efficient electrical and mechanical connection of the tabs to the capacitor section are accomplished while avoiding poor connection to the capacitor section by contaminated soldering flux or oxidation of the electrode materials.

Modifications, changes and improvements to the preferred forms of the invention herein disclosed, described and illustrated may occur to those skilled in the art who come to understand the principles and precepts thereof. Accordingly, the scope of the invention should not be limited to the particular embodiments set forth herein, but rather should be limited only by the advance by which the invention has promoted the art.

What is claimed is:

1. A method of attaching an electrically conductive lead to an end of a tightly wound capacitor section having electrode windings exposed to said end, the method comprising: masking said end of the capacitor section to expose only a predetermined portion, spraying a first thin layer of liquefied conductive metal onto said predetermined portion, allowing said first conductive metal layer to solidify, positioning an electrically conductive terminal immediately adjacent to said first solid conductive metal layer, securing said conductive terminal to said first solid metal layer, spraying a second layer of liquefied conductive metal onto said predetermined portion superposed onto said first layer and said conductive terminal, and allowing said second layer of conductive metal to solidify.

2. The method according to claim 1 wherein securing said conductive terminal to said first layer includes engaging said conductive terminal with a welding electrode in at least one location, passing an electrical current through said welding electrode to cause said conductive terminal to become permanently fused to said first layer.

3. The method according to claim 1 wherein spraying said first and second layers of conductive metal onto said capacitor section includes accumulating a thickness of conductive metal for each of said first and second layers of approximately 0.020 inch.

* * * * *